(12) United States Patent
Lin et al.

(10) Patent No.: US 11,884,043 B2
(45) Date of Patent: Jan. 30, 2024

(54) LAMINATE OF FILM WITH VAPOR-PERMEABLE BARRIER FUNCTION

(71) Applicant: FOSHAN KING WONDER HI-TECH CO., LTD., Guangdong (CN)

(72) Inventors: Yuwei Lin, Guangdong (CN); Yaogen Wu, Guangdong (CN)

(73) Assignee: FOSHAN KING WONDER HI-TECH CO., LTD., Guangdong (CN)

(*) Notice: Subject to any disclaimer, the term of this patent is extended or adjusted under 35 U.S.C. 154(b) by 0 days.

(21) Appl. No.: 16/620,132

(22) PCT Filed: Apr. 28, 2017

(86) PCT No.: PCT/CN2017/082476
§ 371 (c)(1),
(2) Date: Dec. 6, 2019

(87) PCT Pub. No.: WO2018/192006
PCT Pub. Date: Oct. 25, 2018

(65) Prior Publication Data
US 2020/0230930 A1    Jul. 23, 2020

(30) Foreign Application Priority Data
Apr. 20, 2017  (CN) .................... 201710261863.8

(51) Int. Cl.
*B32B 27/12* (2006.01)
*B32B 3/10* (2006.01)
(Continued)

(52) U.S. Cl.
CPC ............. *B32B 27/12* (2013.01); *B32B 3/10* (2013.01); *B32B 5/022* (2013.01); *B32B 5/026* (2013.01);
(Continued)

(58) Field of Classification Search
CPC .......... B32B 27/12; B32B 27/08; B32B 3/10; B32B 5/022; B32B 5/026; B32B 5/26;
(Continued)

(56) References Cited

U.S. PATENT DOCUMENTS 5,695,868 A    12/1997  McCormack
5,800,928 A     9/1998  Fischer et al.
(Continued)

FOREIGN PATENT DOCUMENTS

CN    1118737    3/1996
CN    1184513    6/1998
(Continued)

OTHER PUBLICATIONS

International Search Report and Written Opinion issued in PCT/CN2017/082476, dated Jan. 30, 2018, 16 pages.

*Primary Examiner* — Michael Zhang
(74) *Attorney, Agent, or Firm* — Hamre, Schumann, Mueller & Larson, P.C.

(57) ABSTRACT

The present invention relates to a laminate of thermoplastic resin film with vapor-permeable barrier function, wherein the laminate comprises: at least one layer of thermoplastic resin film having a continuous structure in a thickness of 1-120 μm with vapor-permeable barrier function; and at least one layer of a natural or chemical product layer, wherein the natural or chemical product layer is a discontinuous film, a non-woven product, an adhesive product, and/or a textile fibre product. In the laminate of the present invention, the gram weight of the product is 1-250 g/m². The laminate of the present invention is desirable in vapour permeability and diffusivity, has a continuous structure, and can block solid dusts with a size of 5 nm or more, aerosols, (Continued)

bacteria, viruses and liquids. Furthermore, the laminate can have a very good blocking effect, thereby having a protective function.

10 Claims, 2 Drawing Sheets (51) Int. Cl.
 B32B 5/02 (2006.01)
 B32B 5/26 (2006.01)
 B32B 27/08 (2006.01)

(52) U.S. Cl.
 CPC .............. *B32B 5/26* (2013.01); *B32B 27/08* (2013.01); *B32B 2255/02* (2013.01); *B32B 2255/26* (2013.01); *B32B 2262/0253* (2013.01); *B32B 2262/0276* (2013.01); *B32B 2307/724* (2013.01)

(58) Field of Classification Search
 CPC ............ B32B 2255/02; B32B 2255/26; B32B 2262/0253; B32B 2262/0276; B32B 2307/724; B32B 2307/7265; B32B 2307/728; B32B 37/20; B32B 2437/00; B32B 2535/00; B32B 2571/00; B32B 2262/0284; B32B 2270/00; B32B 2274/00
 See application file for complete search history.

(56) References Cited

U.S. PATENT DOCUMENTS

| | | | |
|---|---|---|---|
| 5,855,999 A | 1/1999 | McCormack | |
| 5,869,414 A | 2/1999 | Fischer et al. | |
| 5,997,981 A | 12/1999 | McCormack et al. | |
| 6,187,696 B1* | 2/2001 | Lim | B32B 5/18 |
| | | | 442/370 |
| 7,674,733 B2 | 3/2010 | Wu et al. | |
| 8,029,892 B2 | 10/2011 | Lacroix | |
| 8,592,028 B2 | 11/2013 | Schosseler et al. | |
| 2003/0113548 A1 | 6/2003 | Corzani et al. | |
| 2003/0181120 A1 | 9/2003 | Wu et al. | |
| 2004/0029467 A1 | 2/2004 | Lacroix | |
| 2006/0057924 A1 | 3/2006 | Cheng et al. | |
| 2008/0182469 A1* | 7/2008 | Suzuki | B32B 27/285 |
| | | | 442/118 |
| 2009/0117362 A1 | 5/2009 | Schosseler et al. | |
| 2013/0177747 A1 | 7/2013 | Lin et al. | |
| 2014/0030495 A1* | 1/2014 | Cartier | C08L 77/06 |
| | | | 156/244.11 |
| 2017/0266919 A1* | 9/2017 | Seok | D06M 17/04 |
| 2019/0168465 A1* | 6/2019 | Lin | B32B 37/06 |

FOREIGN PATENT DOCUMENTS

| | | |
|---|---|---|
| CN | 1247545 | 3/2000 |
| CN | 1270554 | 10/2000 |
| CN | 1111476 C | 6/2003 |
| CN | 1446242 | 10/2003 |
| CN | 1649730 | 8/2005 |
| CN | 1229222 C | 11/2005 |
| CN | 1762691 | 4/2006 |
| CN | 103192567 | 7/2013 |
| WO | 96/28597 | 9/1996 |
| WO | 98/29480 | 7/1998 |
| WO | 02/14417 | 2/2002 |
| WO | 02/060687 | 8/2002 |
| WO | 2007/022990 | 3/2007 |

\* cited by examiner

LAMINATE OF FILM WITH VAPOR-PERMEABLE BARRIER FUNCTION

FIELD OF THE INVENTION

The present invention relates to a laminate of thermoplastic resin film with vapor-permeable barrier function and a method for preparation thereof. More particularly, the present invention relates to a laminate comprising at least one layer of non-amorphous thermoplastic resin film having a continuous structure in a thickness of 1-120 μm with vapor-permeable barrier function and at least one layer of a natural or chemical product layer as well as its preparing method.

BACKGROUND OF THE INVENTION

The protective laminates in the art, particularly laminates for personal protection use, more particularly the isolation-type protective materials which is impervious to 5 nm solid dusts, aerosols, bacteria, viruses and liquids, are disadvantageous in that they are not vapor-permeable such that it will be stuffy or even suffocating when wearing such kind of protective laminates. On the other hand, some protective laminates with vapor-permeability, especially those with vapor-permeability by physical pores, are difficult to achieve real barrier function. Therefore the present protective laminates often have poor vapor permeability. Some are so-called continuous vapor-permeable laminates with barrier function, but they are often incapable of blocking 5 nm solid dusts, aerosol, bacteria, viruses and liquids. The real vapor-permeable laminates with barrier function are is very costly. The barrier performance and vapor permeability of protective laminates will be affected by various factors, including manufacturing process of laminates, the structure and thickness of the product layers, temperatures at various positions, pressures, frictions, the type of resin for bonding film and product layer, thickness, porosity, applying techniques, etc.

CN 201210005351.2 disclosed a laminate of a thermoplastic resin film prepared by a thermal pressing method. However, it failed to further disclose key elements for controlling barrier performance and vapor permeability during the preparing process.

CN 1111476C disclosed a method for preparing a stretched vapor-permeable polyolefin film and a fiber polyolefin non-woven fabric. The obtained film had a physical pore with vapor permeation of 200 nm to 1 mm, and thus complete blocking was impossible.

CN 1229222C also employed a similar method in which a specified amount of binder was added into the formulation of the polyether ester film which was directly laminated with the textile fabric. It was advantageous in reducing glue cost. However, if the film used is too thin its barrier performance will be hampered, and f the film is too thick the cost is substantially increased. In addition adding such a binder tremendously reduced the vapor permeation of the film.

U.S. Pat. No. 6,187,696 B1 disclosed the use of a hot melt adhesive for bonding a non-woven fabric to a thermoplastic resin film. However, this invention mainly illustrated the performance of the bonded product, yet did not describe how to guarantee properties such as the continuity of the film.

CN98809048.1 disclosed a film having an amorphous polymer film which was laminated onto a pre-bonded non-woven fiber for use in a surgical drape, and after being laminated, the film was stretched and rebounded. This would likely deform or perforate the film at the position where it was bonded. CN03809244.1 disclosed a randomly arranged macro-pore formed due to the incremental stretching of an elastomeric film laminated to a non-woven fabric. CN1247545 disclosed a vapor-permeable laminate comprising an oriented microporous elastomeric film and at least one support layer bonded to the film. CN1762691 related to a unique elastic laminate impervious to fluid comprising of elastic films and elastic-non-wovens. Circular pores formed at the surroundings of the weld points which were used to bond the laminate during its manufacture. Such circular pores rendered the laminate vapor-permeable. However, complete barrier was also impossible in this patent.

CN1184513 provides a non-woven fiber laminate with improved barrier performance, yet it just improved the barrier properties of the product layer.

SUMMARY OF THE INVENTION

It is one of objects of the present invention to provide a laminate with thermoplastic resin film with vapor-permeable barrier function and preparation method thereof. The laminate with a continuous structure and smooth appearance has excellent vapor permeability based on penetration-diffusion principle and is capable of blocking solid dusts having a size larger than 5 nm, aerosols, bacteria, virus, liquid, etc.

In one aspect, the present invention provides a laminate of thermoplastic resin film with vapor-permeable barrier function, wherein the laminate comprises:
- at least one layer of non-amorphous thermoplastic resin film having a continuous structure in a thickness of 1-120 μm with vapor-permeable barrier function; and
- at least one layer of natural or chemical product layer;
- wherein the natural or chemical product layer is a discontinuous film, a non-woven product, a viscose fibre product, and/or a textile fiber product;
- wherein the natural or chemical product layer has a gram weight of 1-250 g/m$^2$; and
- wherein the thermoplastic resin film with vapor-permeable barrier function is formed from a thermoplastic resin composition which, by mass percentage, comprises the following components: 1-99% thermoplastic non-amorphous elastomer resin material with a proportion of 5% or more hydrophilic segment, 0.01-99% polar thermoplastic resin material, and 0-30% compatibilizer selected from thermoplastic resin material.

In the above composition, the thermoplastic elastomer resin material containing 5% or more hydrophilic segment is one of the following resins or a blend thereof: copolymer or blend of dicarboxylic acid with diol and epoxide, copolymer or blend of diamide with diol and epoxide, copolymer or blend of binary isocyanic acid with diol and epoxide, copolymer or blend with hydrophilic radicals of ionic surfactant, such as copolymer or blend of carboxylic acid group (—COOH), sulfonic acid group (—SO3H), sulfate group and phosphate group and the like, copolymer and blend with cationic surfactant group such as copolymer or blend of an amino group (—NH2) and quaternary ammonium group, and/or copolymer and blend with nonionic surfactant group such as copolymer and blend with an oxygen-containing group consisting of an ether group, a hydroxyl group (—OH), aldehyde (—CHO), carbonyl and block polyether. The proportion of the hydrophilic segment is preferably from 5% to 95%, more preferably from 5% to 90%. The proportion of the hydrophilic segment in the formulation will affect vapor permeability. But if the proportion is too high, it will result in forming discontinuous film and reducing mechanical strength.

In the above composition, the polar resin material is one or more thermoplastic resin materials selected from the group consisting of: polyvinyl chloride resin, vinylidene chloride resin, vinyl acetate resin, polyvinyl alcohol, polyvinyl acetal, polystyrene, AS resin, SAN resin, SBS resin, ABS resin, acrylic resin, nylon resin, polyacetal resin, polyformaldehyde resin, polycarbonate resin (PC), polysulfone resin, celluloid, cellulose acetate plastics, thermoplastic polyester, epoxy resins, thermoplastic acrylic resin, and copolymer or blend thereof.

In the above composition, the compatibilizer is one or more thermoplastic resin materials selected from the group consisting of: cyclic anhydride (such as MAH) graft polymer or its blend, carboxylic acid graft polymer or its blend, epoxy graft polymer or its blend, oxazoline graft polymer or its blend, imide graft polymer or its blend, isocyanate graft polymer or its blend, and reactive compatibilizer with low molecular weight and mixture thereof.

In the present invention, the vapor permeation rate of the thermoplastic resin film is affected greatly by the proportion relationship of the thermoplastic elastomer resin material, the polar thermoplastic resin material and the thermoplastic resin material used as the compatibilizer in the composition, particularly by the proportion of the compatibilizer, which serves to regulate the compatibility between the thermoplastic elastomer resin material and the polar thermoplastic resin material. The more compatible the materials in the film are, the less vapor permeability the film has. However, if incompatibility is too high, it will result in a great decrease in the mechanical strength of the film.

Preferably, by mass percentage, the composition of the present invention comprises: 3 to 95% thermoplastic elastomer resin material containing 5% or more hydrophilic segment, 1-99% polar thermoplastic resin material, 0-28% compatibilizer selected from thermoplastic resin material. More preferably, the composition of the present invention comprises: 3 to 95% thermoplastic elastomer resin material containing 5% or more hydrophilic segment, 2 to 99% polar thermoplastic resin material, and 0 to 25% compatibilizer selected from thermoplastic resin material.

In the present invention, when the thermoplastic resin composition comprises 30% to 60% polar thermoplastic resin material, the compatibilizer should be selected from a polar thermoplastic resin material. In a preferred embodiment of the present invention, the composition of the present invention comprises: 40 to 70% thermoplastic elastomer resin material containing 5% or more hydrophilic segment, 30 to 60% polar thermoplastic resin material, and 1-10% compatibilizer selected from polar thermoplastic resin material.

As an embodiment of the present invention, there is a physical interval gap having a size of 700 nm or more between the thermoplastic resin film with vapor-permeable barrier function and the product layer in the laminate of the present invention, and the physical interval gap can be provided with one or more resin layers of thermoplastic resin and/or curable resin for bonding the product layer to the thermoplastic resin film. The resin layer provided in the physical interval gap can be continuous or discontinuous, preferably discontinuous. In the case where the resin layer provided in the physical interval gap is discontinuous, the thermoplastic resin film with vapor-permeable barrier function and the product layer can be separated from each other or in contact with each other in the positions where the intermediate resin layer is absent. Please note the resin layer provided in the physical interval gap can also be named as the resin layer with physical interval gap.

Preferably, the resin used in the intermediate resin layer can be a thermoplastic resin and/or a semi-cured resin. When it is a thermoplastic resin, it preferably contains at least 20% or more polar thermoplastic resin, and if it is a curable resin, it preferably contains at least 20% or more polar thermoplastic resin and 0.5% to 10% curing agent. The curing agent is preferably a heat curing agent or a moisture curing agent. The polar thermoplastic resin material used here is one or more thermoplastic resin materials selected from the group consisting of: polyvinyl chloride resin, vinylidene chloride resin, vinyl acetate resin, polyvinyl alcohol, polyvinyl acetal (PVA), polystyrene, AS resin, SAN resin, SBS resin, ABS resin, acrylic resin, nylon resin, polyacetal resin, polyformaldehyde resin, polycarbonate resin (PC), polysulfone resin, celluloid, cellulose acetate plastics, thermoplastic polyester, epoxy resins, thermoplastic acrylic resin, thermoplastic polyurethane, and the like, and copolymer or blend thereof. Preferably, it can be selected from alkene resin, nylon resin, thermoplastic polyester, epoxy resins, thermoplastic acrylic resin, thermoplastic polyurethane, and the like. The use of the polar thermoplastic resin material is advantageous in that the polarity can increase the inter-molecular entanglement between different layers for bonding the product layer and the film. It can also prevent from permeation and enhance barrier effect. Particularly during heat sealing in the post processing it will show very good effect with strengthening inter-layer bonding and increasing difficulty for virus/blood penetration. Here the post processing refers mainly to the sealing of the sealed region with typical means such as high frequency, heat stitching, ultrasonic, etc. Thermoplastic or semi-curable resins can be reactivated and these materials can be more tightly and densely re-entangled under pressure.

In the laminate of the present invention, the material of the natural or chemical discontinuous product layer is thermoplastic resin and/or curable resin.

In the laminate of the present invention, the textile fiber in the natural or chemical product layer is fibrous material selected from the group consisting of: polyester and its derivative fibers, nylon and its derivative fibers, spandex (polyurethane fiber) and its derivative fibers, polypropylene fiber and its derivative fiber, polyolefin and its derivative fiber, aramid and its derivative fiber, polyimide and its derivative fiber, cotton products, etc.

In the laminate of the present invention, the method for producing a non-woven product is selected from the group consisting of: wet non-woven, stitch-bonding, synthetic leather, film splitting, spunbonding, melt blowing, spunlacing, needle punching, thermal bonding, chemical bonding, and the like.

In the laminate of the present invention, the synthetic resin for non-woven use is selected from the group consisting of: polyurethane and its derivatives thereof, polyolefin and its derivatives thereof, polyester and its derivatives thereof, nylon and its derivatives thereof, PVA and its derivatives thereof, aramid and its derivatives thereof, polyimide and its derivatives thereof, etc.

In the laminate of the present invention, there is a resin layer of thermoplastic resin and/or curable resin with physical interval gap between the thermoplastic resin film with vapor-permeable barrier function and the product layer. This resin layer can form a physical or chemical bonding between the product layer and the thermoplastic resin film. The resin of the resin layer can be the same resin as that in the film, or other types of thermoplastic resin and/or curable resin.

In the laminate of the present invention, the other types of thermoplastic resins and/or curable resins mentioned above can preferably be selected from a group consisting of: urethane resin, acrylic resin, siloxane resin, olefin resin, polyester resin, nylon resin, natural adhesive resin, rubber resin, styrene resin, amine resin, and blend thereof.

In the laminate of the present invention, there is a resin layer made from thermoplastic resin and/or curable resin with physical interval gap of 700 nm or more between the thermoplastic resin film with vapor-permeable barrier function and the product layer. The resin of the resin layer can be formed into a liquid before being applied to the product layer and the film, and the viscosity of the liquid resin is preferably within the range of 100 to 80,000 cps, more preferably within the range of 200 to 50,000 cps, and still more preferably between 300 and 40,000 cps. The viscosity of the liquid resin will have an effect on vapor permeability and barrier property. If the viscosity is too low, it can penetrate and block the pores of the product layer, narrowing the gap of the physical interval gap, and disrupting the continuity of the winding-unwinding process of the film.

In the laminate of the present invention, the resin layer with the physical interval gap between the film and the product layer has a gram weight of 0.1 g/m$^2$ to 550 g/m$^2$, preferably of 0.6 g/m$^2$ to 400 g/m$^2$, more preferably of 0.6 g/m$^2$ to 100 g/m$^2$. The physical interval gap is preferably from 700 nm to 3 mm, more preferably from 1 μm to 2.5 mm, and more preferably from 1 μm to 2 mm. The control of the thickness of the resin layer, the size of the physical interval gap and the gram weight of the resin layer can substantially affect the peeling force and vapor permeation rate of the laminate. If the resin layer is too thick and its gram weight is too heavy then there will be a negative impact on the vapor permeation rate of the laminate.

In the laminate of the present invention, the physical interval gap of 700 nm or more between the thermoplastic resin film and the product layer can have a shape consistent with the shape of the product layer, or can be customized for different applications. The preferable shape includes: foggy droplet shape, round shape, decorative pattern shape, irregular net shape, spiral shape, hollow shape, omega shape, etc. The size and shape of the physical interval gap will affect the vapor permeability and barrier properties of the laminate. The barrier property will decrease with the increase of the size of the physical interval gap, particularly the hydraulic resistance of the product layer and the film. But if the physical interval gap is too small it will also have a negative effect on the vapor permeability.

In the laminate of the present invention, the resin layer with physical interval gap between the thermoplastic resin film and the product layer can be applied between the thermoplastic resin film and the product layer by means of: transfer printing, coating, foggy dropleting, curtain fogging, extrusion, or heat sealing. Preferably, this application is performed in a manner that causes less disruption to the thermoplastic resin film, and more preferably in a manner that are less likely to cause leaking.

In the laminate of the present invention, when the laminate has a structure with the product layer on both sides of the thermoplastic resin film then the resin layer with physical interval gap is applied stepwise or simultaneously onto the product layer, when the laminate has a structure with the thermoplastic resin film on both sides of the product layer then the resin layer with physical interval gap is applied stepwise or simultaneously on the thermoplastic resin film, and when the laminate has a structure with the product layer on only one side of the thermoplastic resin film then the resin layer with physical interval gap is applied onto the product layer or the thermoplastic resin film In the laminate of the present invention, the product layer and the thermoplastic resin film are pressed by a rubber roller and a steel roller after the resin layer with physical interval gap is applied, and if the resin of the resin layer with physical interval gap is a curable resin, a curing process will be carried out after it is pressed and winded. The rubber roller has a hardness of no more than 150 D, and the material of the rubber roller is synthetic rubber and/or natural rubber, preferably having a hardness of no more than 145 D. The temperature of the steel roller is preferably 0° C. to that lower than the initial melting temperature in the composition contained in the film. The pressing pressure is preferably 0.1 MPa to 0.6 MPa. The laminating speed is within the range of 1-300 m/min. The surface of the roller can be rough, smooth, or with lines, and preferably the thickness of the lines or the roughness of the surface of the roller shall not be greater than 60% of the thickness of the product layer. All factors mentioned above can affect the barrier properties of the laminate.

In the laminate of the present invention, the bonding strength between the product layer and the thermoplastic resin film is greater than 0.01 N/15 mm, preferably greater than 0.02 N/15 mm, and more preferably greater than 0.025 N/15 mm.

The laminate of the present invention has a vapor permeation rate of 200 g/m$^2$*24 h or more (according to ASTM E96-2000 D standard), preferably 600 g/m$^2$*24 h or more, still more preferably 800 g/m$^2$*24 h or more.

In the laminate of the present invention, the laminate has a barrier function with a hydrostatic pressure test of 1400 mm H$_2$O or more (according to AATCC 127), the laminate is capable of blocking solid dusts with a size larger than 5 nm and aerosols (according to YY/T 0506.5-2009), and the laminate passes a liquid barrier test with a Dyne value of less than 50, a blood barrier test (according to ASTM F1670) and a virus/bacterial barrier test (according to ASTM F1671).

The laminate of the present invention has a continuous structure and smooth appearance with excellent vapor permeability based on penetration-diffusion principle and is capable of blocking solid dusts having a size larger than 5 nm, aerosols, bacteria, virus, liquid, etc. It can be used in personal protective equipment (PPE).

The present invention is further described in details with reference to the accompanying drawings and embodiments. The embodiments described below are just for the purpose of understanding the present invention, and they could not be construed as a limitation of the present invention in any way.

DESCRIPTION OF THE PREFERRED EMBODIMENTS

Figure 1:
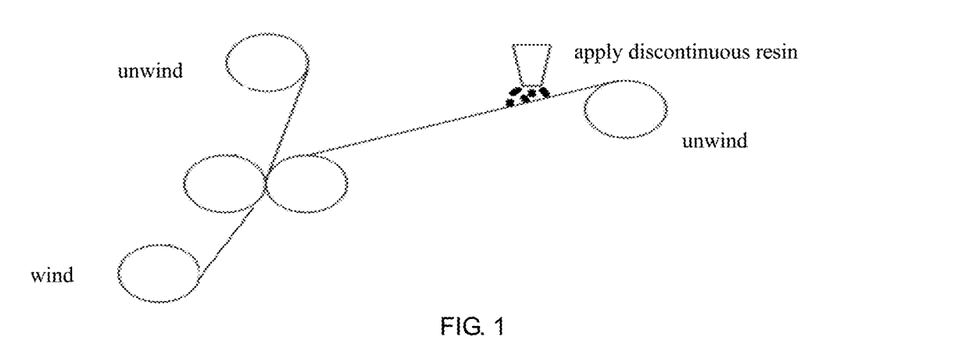
FIG. 1 is a flow chart showing the preparation of a laminate with vapor-permeable barrier function according to one embodiment of the present invention.
Figure 2:
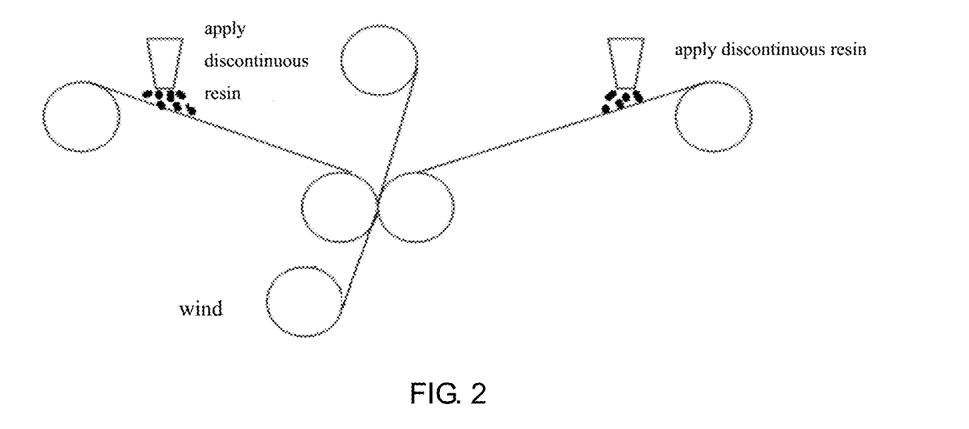
FIG. 2 is another flow chart showing the preparation of a laminate with vapor-permeable barrier function according to another embodiment of the present invention.
Figure 3:
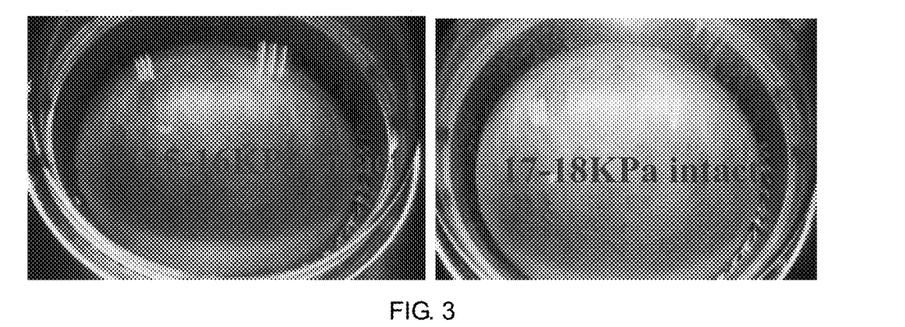
FIG. 3 is a schematic diagram showing the barrier of alcohol by the laminate of the present invention (the alcohol having a Dyne value of 30)
Figure 4:
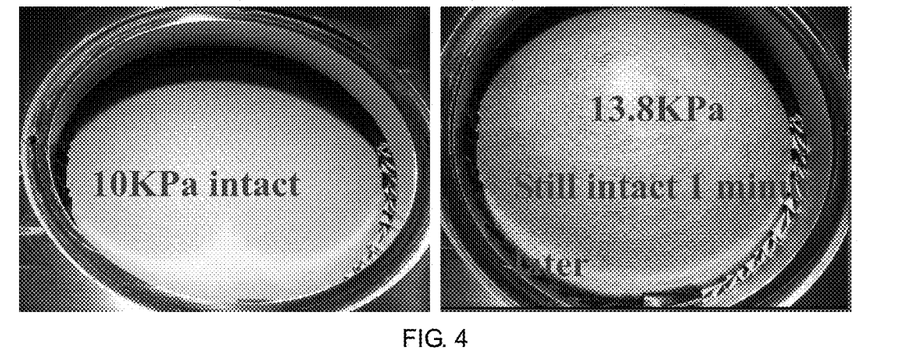
FIG. 4 is a schematic diagram showing the barrier of blood by the laminate of the present invention.

In the following embodiments, methods for testing parameters such as gram weight, peeling force, flatness, and moisture (vapor) permeability are as follows:

(1) Thickness Test Standards:
A) Testing equipment: analytical balance, with an accuracy of 0.001 g.
B) Sampling criteria: sampling at a distance of about 15 mm from the side in the width direction, sampling every 300 mm in the longitudinal direction. The sample size is 100×100 mm, and the total number of samples is 100 pieces in width and length direction.

(2) Blood Barrier Test Standards:
A) Test standard: ASTM F 1670
B) Sampling standard:
 i. Randomly select 3 samples for each time based on criteria such as material, composition, position (when non-uniform materials are used) or other conditions.
 ii. If the material has a structure with a barrier film sandwiched between the two fiber layers, the capillary effect at the edge of the material can result in false positives in the testing results, causing the sample to fail the test. In this case, the edges of the test sample should be sealed to avoid possible capillary effects. The sample should be sealed with an adhesive, a sealant, a paraffin wax or a foam with a binder before the test.
 iii. Seal the sample only on the edge, leaving the open area of 57 mm at the center of the sample to be tested.
 iv. If the sample is to be sterilized before it becomes a finished product, the sample should be disinfected. The disinfection process shall not affect the performance of the sample and must meet the manufacturer's requirements.
 v. The sample should be treated for at least 24 hours at a temperature of (21±5)° C. and a relative humidity of 30-80% before the test.
 vi. If possible, other pre-treatment processes (such as sterilization) are carried out to evaluate the performance of the sample.
C) Test method: The sample is subjected to a penetration test of simulated body fluid (synthetic blood) for a specified time and at a specified pressure (first at 0 kPa for 5 minutes, then at 13.8 kPa for 1 minute, and then at 0 kPa for 54 minutes). Penetration is then judged by the naked eye. Any evidence showing penetration of the synthetic blood indicates a failure in the blood barrier property of the sample. The result is "pass/fail".

(3) Barrier Virus Standards:
A) Test standard: ASTM F 1671;
B) Sampling standards:
i. Randomly select 3 samples for each time based on criteria such as material, composition, position (when non-uniform materials are used) and other conditions.
ii. If the material has a barrier film sandwiched between the two fiber layers, the capillary effect at the edge of the material can result in false positives in the testing results, causing the samples to fail the test. In this case, the edges of the test sample should be sealed to avoid possible capillary effects. The sample should be sealed with an adhesive, a sealant, a paraffin wax or a foam with a binder before the test.
iii. Seal the sample only on the edge, leaving a 57 mm open area at the center to be tested;
iv. If the sample is to be sterilized before it becomes a finished product, the sample should be disinfected. The disinfection process shall not hinder the performance of the sample and must meet the manufacturer's requirements.
v. The sample should be treated for at least 24 hours at a temperature of (21±5)° C. and a relative humidity of 30-80% before the test.
vi. If possible, other pretreatment processes (such as sterilization) can be carried out to evaluate the performance of the sample.
C) Test method: The sample is subjected to a penetration test of the phage liquid Phi-X174 for a specified time and at a specified pressure (first at 0 kPa for 5 minutes, then at 13.8 kPa for 1 minute, and then at 0 kPa for 54 minutes). When no liquid permeation occurs, an analytical procedure is carried out to determine if the virus passes through the sample. If evidence shows that a fluid or virus penetration occurs, it means the sample fails the test. The result is "pass/fail".

(4) Moisture Permeability:
The ASTM E96 distilled water positive cup D method is simulated, at a condition with a wind speed of 1 m/s, humidity of 50%, temperature of 38 degrees Celsius, by means of using a moisture permeability equipment manufactured by Toyo Seiki company.

5) Hydrostatic Pressure Test Standard:
A) Test standard: GB/T 4744-2013
B) This standard indicates the resistance that water is subjected when passing through the fabric by means of hydrostatic pressure. Under standard atmospheric conditions, one side of the sample is subjected to a continuously rising water pressure until three water seepage points appear on the other side, and the pressure value at which the third water seepage point appears is recorded. The value is then used to evaluate the waterproof function of the sample.

(6) Fine Particle Test Standards:
A) Test standard: YY/T 0506.5-2009
B) This test is carried out on test pieces each fixed to a container. Among these containers, 5 containers of talc power carrying *Bacillus subtilis* and 1 container containing unstained talc powder are used as controls. Insert one culture dish close from the bottom of each container. The apparatus for supporting the container is oscillated by a gas ball type oscillator, and the talc powder penetrating through the test piece drop onto the culture dish. Then the culture dish is taken out to undergo a culturing process. The generated colonies are counted. The samples are conditionally adjusted and tested at a temperature of 20° C.±2° C. and a relative humidity of 65%±5%. The samples pass the test if there is no power penetration.

(7) Pinhole Test Standard:
A) Test standard: penetrative liquid prepared by the testing personnel;
B) Sampling criteria: 3 samples are randomly selected for each material;
C) The penetrative liquid is brushed to the suture. If liquid penetration appears in 60 minutes, the sample fails to pass the test. On the other hand, if there's no liquid penetration, it means no pores emerge.

(8) Peel Force Test Standard:
A) Test standard: GB8808;
B) Sampling standard: sampling at a distance of about 15 mm from the side in the width direction, sampling every 500 mm in the longitudinal direction. The size of the test sample is 15×180 mm, and the total number of samples is 50 in the width direction and longitudinal direction;

EXAMPLES 1-7

Respectively take thermoplastic resin films with thickness of 33 μm, 15 μm, 12 μm, 9 μm, 8 μm, 5 μm and 3 μm which are made from thermoplastic resin composition comprising: 94% thermoplastic non-amorphous elastomer resin materials which contains 40% to 60% hydrophilic segment, 6% polar thermoplastic resin material, and 0% compatibilizer. Both sides of the thermoplastic resin film will be applied with polyester fiber Tricot as product layer with a gram weight of 30 g/m². A melted urethane resin (liquid) with a viscosity of 6000 cps is first applied onto one side of the thermoplastic resin film by means of transfer-printing, then the product layer is applied to this side of the thermoplastic resin film to form a resin layer having a 10 g/m² gram weight with circular physical interval gaps of 0.6 mm between the product layer and the thermoplastic resin film. Then these layers are pressed at the pressure of 0.4 MPa by a rubber roller with a hardness of 90 D and by a smooth steel roller having a temperature of 25° C. to form a three-layer laminate. Here, the speed of the production line is 10 m/min. In the case where the 33 μm or 15 μm resin film is used, the bonding strengths between the product layer and the thermoplastic resin film are respectively 3 N/15 mm and 4.5 N/15 mm, and in the case where thermoplastic resin films with other thicknesses are used, the films are broken. For the other side of the thermoplastic resin layer, which is a later laminated side, perform similar steps as the side which is previously laminated, and results are also similar. Laminates herein formed have vapor permeation rates of 1115, 1240, 1320, 1414, 1450, 1455, and 1458 g/m²*24 h respectively (ASTM E96-2000 D method), and have a barrier function. The hydrostatic pressures here are 35,000, 15,000, 10,000, 9,000, 6,000, 5,000, and 2,000 mm H2O (AATCC 127) respectively. Except the example where the thermoplastic non-amorphous elastomer resin film is 3 μm in thickness, all of obtained laminates in the other examples pass the liquid barrier test with a dyne value of 42, the blood barrier test (ASTM F1670), and the virus bacterial barrier test (ASTM F1671), and are capable of blocking solid dusts with a size of 5 nm or more and aerosols (YY/T 0506.5-2009). These examples show that the thinner the thermoplastic resin film, the worse the barrier capability and the better the vapor permeability.

EXAMPLES 8-14

Take, respectively, the thermoplastic resin film of 9 μm which is made from a thermoplastic resin composition comprising the following different proportions of components:

94% thermoplastic non-amorphous elastomer resin material containing 40% to 60% hydrophilic segment, 6% polar thermoplastic resin material and 0% compatibilizer;

94% thermoplastic non-amorphous elastomer resin material containing 20% to 40% hydrophilic segment, 6% polar thermoplastic resin material and 0% compatibilizer;

80% thermoplastic non-amorphous elastomer resin material containing 40% to 60% hydrophilic segment, 20% polar thermoplastic resin material and 0% compatibilizer;

70% thermoplastic non-amorphous elastomer resin material containing 40% to 60% hydrophilic segment, 20% polar thermoplastic resin material and 10% polar thermoplastic resin material serving as a compatibilizer;

79% thermoplastic non-amorphous elastomer resin material containing 40% to 60% hydrophilic segment, 20% polar thermoplastic resin material and 1% polar thermoplastic resin material serving as a compatibilizer;

30% thermoplastic non-amorphous elastomer resin material containing 40% to 60% hydrophilic segment, 70% polar thermoplastic resin material and 0% compatibilizer.

An olefin non-woven fabric product with a gram weight of 23 g/m² will be used as the product layer and applied to the both sides of the thermoplastic resin film. A dissolved olefin resin with a viscosity of 700 cps is stepwise applied onto two layers of olefin non-woven fabric by a transfer-printing to form a resin layer having square physical interval gaps of 0.6 mm with a gram weight of 1.5 to 2.5 g/m². These layers are then stepwise pressed by a rubber roller with a hardness of 90 D and a smooth steel roller with a roller temperature of 90° C. at a pressure of 0.4 MPa. Here the speed of the production line is 80 m/min. The bonding strengths between the product layer and one side of the thermoplastic resin film are 0.7, 0.9, 0.89, 1.1, 1.0 and 1.3 N/15 mm respectively, and the bonding strength between the product layer and the later bonded side of the thermoplastic resin film is 0.5, 0.7, 0.75, 1.0, 0.98 and 1.12 N/15 mm respectively. The formed laminates have vapor permeation rates of 1750, 1230, 1540, 1120, 1340 and 800 g/m²*24 h respectively (ASTM E96-2000 D method), and have a barrier function. The hydrostatic pressures are all in the range of 1600-2500 mm H₂O (according to AATCC 127). All the obtained laminates in these examples pass the fluid barrier test with the dyne value of 42, the blood barrier test (according to ASTM F1670), the virus bacterial barrier test (according to ASTM F1671), and are capable of blocking solid dusts with a size of 5 nm or more and aerosols (YY/T 0506.5-2009). These examples show that the more hydrophilic components of the film, the better its vapor permeability. Vapor permeability is also related to the polar thermoplastic resin material serving as a compatibilizer. The worse the barrier property, the better the vapor permeability.

EXAMPLES 15-19

Take the thermoplastic resin film of 9 μm which is made from a thermoplastic resin composition comprising: 94% thermoplastic non-amorphous elastomer resin material containing 40%-60% hydrophilic segment, 6% polar thermoplastic resin material, and 0% compatibilizer. An olefin non-woven fabric product with a gram weight of 23 g/m² will be used as the product layer and applied to the both sides of the thermoplastic resin film. A melted olefin resin with a viscosity of 100, 3500, 6000 and 40,000 cps respectively is stepwise applied onto two layers of olefin non-woven fabric by a transfer-printing to form a resin layer having foggy droplet physical interval gaps of 0.1-1 mm with a gram weight of 2 to 3 g/m². The foggy droplet particles increase in size with the increase of viscosity. After these layers are pressed by a rubber roller with a hardness of 90 D and a smooth steel roller with a roller temperature of 30° C. at a pressure of 0.4 MPa, a laminate is formed, in which the speed of the production line is 80 m/min. The bonding strength between the product layer and one side of the thermoplastic resin film are 1.12, 1.15, 1.16 and 2 N/15 mm respectively, and the bonding strength at the other side of the thermoplastic resin film which is later bonded is 1.11, 1.12, 1.13 and 1.8 N/15 mm respectively. The obtained laminate has vapor permeation rates of 1450, 1720, 1760 and 1890 g/m2*24 h respectively (according to ASTM E96-2000 D method) with barrier function. The hydrostatic pressures are all in the range of 1600-2500 mm H₂O (according to AATCC 127). Except examples 15 and 19, all obtained laminates in the other examples pass liquid barrier test with a Dyne value of 42, blood barrier test (according to ASTM F1670), virus bacterial barrier test (according to ASTM F1671), and are capable of blocking solid dusts with a size of 5 nm or more and aerosols (according to YY/T 0506.5-2009). These examples show that the viscosity of the bonding layer (the resin layer) substantially affect the barrier properties of the laminate prepared by the stepwise method. When the viscosity is too large or too small it will reduce the barrier property and also affect on the peeling force.

EXAMPLES 20-21

Take the thermoplastic resin film of 9 μm which is made from a thermoplastic resin composition comprising: 94% thermoplastic non-amorphous elastomer resin material containing 40%-60% hydrophilic segment, 6% polar thermoplastic resin material, and 0% compatibilizer. An olefin non-woven fabric product with a gram weight of 23 g/m$^2$ will be used as the product layer and applied to the both sides of the thermoplastic resin film. A melted olefin resin with a viscosity of 100 and 3500 cps respectively is simultaneously applied onto two layers of olefin non-woven fabric by a transfer-printing to form a resin layer having foggy droplet physical interval gaps of 0.1-1 mm with a gram weight of 2 to 3 g/m$^2$. These layers are then pressed by a rubber roller with a hardness of 90 D and a smooth steel roller with a roller temperature of 30° C. to form a laminate at a pressure of 0.4 MPa, and the speed of the production line speed is 80 m/min. The bonding strength between the product layer and the thermoplastic resin film is 0.5, 0.72 N/15 mm with respect to the rubber roller surface, and 0.25, 0.3 N/15 mm with respect to the steel roller surface. The obtained laminates have a vapor permeation rate of 1710 g/m$^2$*24 h (according to ASTM E96)-2000 D method) with barrier function. The hydrostatic pressure is 2200 mm H$_2$O (according to AATCC 127). They all pass the liquid barrier test of Dyne value 42, the blood barrier test (according to ASTM F1670) and the virus bacterial barrier test (according to ASTM F1671), and are capable of blocking solid dusts with a size of 5 nm or more and aerosols (according to YY/T 0506.5-2009). These examples show that an one-time forming process helps to improve the barrier property of the laminate.

EXAMPLES 22-25

In examples 22 to 25, take the thermoplastic resin film of 9 μm which is made from a thermoplastic resin composition comprising: 94% thermoplastic non-amorphous elastomer resin materials having 40%-60% hydrophilic segments, 6% polar thermoplastic resin material, 0% compatibilizer. An olefin non-woven fabric product with a gram weight of 23 g/m$^2$ will be used as the product layer and applied to the both sides of the thermoplastic resin film. A dissolved olefin resin with a viscosity of 700 cps is stepwise applied onto two layers of olefin non-woven fabric by a transfer-printing to form a resin layer having net-shape physical interval gaps of 0.3 mm with a gram weight of 1.5 to 2.5 g/m$^2$. In example 23, these layers are pressed at a pressure of 1 MPa to form a laminate, whereas in the remaining examples they are pressed at a pressure of 0.4 MPa. In example 24, a rubber roller with a hardness of 160 D is used, whereas in the other examples a rubber roller having a hardness of 90 D is used. In example 25, the smooth steel roller has a roller temperature of 200° C., while in the rest examples the smooth steel rolls have a roller temperature of 90° C. The speed of the production line is 80 m/min. The bonding strength between the product layer and one side of the thermoplastic film is 0.7, 0.93, 0.26 and 1.22 N/15 mm respectively, and the bonding strength between the product layer and the later bonded side of the thermoplastic film is 0.58, 0.77, 0.15 and 1.0 N/15 mm respectively. The obtained laminates have a vapor permeation rate of 1745, 1889, 1720 and 1930 g/m2*24 h respectively (according to ASTM E96-2000 D method). The hydrostatic pressure pressures are 2300, 500, 1450 and 200 mm H$_2$O respectively (according to AATCC 127). With the exception of examples 23 and 25, all other examples pass the following tests: the liquid barrier test of Dyne 42, the blood barrier test (according to ASTM F1670), the virus bacterial barrier test (according to ASTM F1671), and the solid dusts and aerosols test which shows that the samples are capable of blocking solid dusts with a size of 5 nm or more and aerosols (according to YY/T 0506.5-2009). These examples show that the greater the pressure, the lower the barrier performance and that great pressure even result in the perforation of the film. It also shows the higher the roller temperature, the lower the barrier performance. High temperature can even result in the perforation of the film. The greater the hardness of the rubber roller, and the lower the barrier performance and the peeling force.

EXAMPLES 26-30

Take the thermoplastic resin film of 9 μm which is made from a thermoplastic resin composition comprising: 94% thermoplastic non-amorphous elastomer resin material containing 40%-60% hydrophilic segment, 6% polar thermoplastic resin material, and 0% compatibilizer. An olefin non-woven fabric product with a gram weight of 23 g/m$^2$ will be used as the product layer and applied to one side of the thermoplastic resin film. A dissolved olefin resin with a viscosity of 700 cps is stepwise applied onto one layer of olefin non-woven fabric by a transfer-printing to form a resin layer having net-shape physical interval gaps of 0.3 mm with a gram weight of 1.5 to 2.5 g/m$^2$. These layers are then pressed by a rubber roller is with a hardness of 90 D and by a steel roller having a temperature of 90° C. at a pressure of 0.4 MPa to form a laminate. The depths of roughness of the steel roller is 1 μm, 20 μm and 120 μm. In example 30, a simultaneous press-bonding method is employed. The speed of the production line is 80 m/min. At the side where the product layer and the thermoplastic resin film are bonded, the bonding strengths are 0.65, 0.83, 0.92 and 0.55 N/15 mm, and in example 30 the bonding strength is 0.28 N/15 mm. The obtained laminates have a vapor permeation rate of 1855, 1890, 2100 and 1772 g/m2*24 h (according to ASTM E96-2000 D method) with barrier function. In examples 26, 27, 29 and 30, the hydrostatic pressures are 2100, 2050, 100, 1550 mm H$_2$O (according to AATCC 127). With the exception of example 29 only, example 26, 27 and 30 all pass the fluid barrier test of dyne value 42, the blood barrier test (ASTM F1670) and the viral/bacterial barrier test (ASTM F1671), and are all capable of blocking solid dusts with a size of 5 nm or more and aerosols (YY/T 0506.5-2009). These examples show that the depths of roughness of the steel roller affect the barrier performance of the laminate: the deeper the roughness, the lower the barrier performance. A large roughness of the steel roller can even result in the perforation of the film. Its impact on the synchronous method is slightly smaller.

EXAMPLES 31-32

Take the thermoplastic resin film of 33 μm which is made from a thermoplastic resin composition comprising: 94% thermoplastic non-amorphous elastomer resin material containing 40% to 60% hydrophilic segment, 6% polar thermoplastic resin material, and 0% compatibilizer. A polyester spunlace fiber cloth with a gram weight of 35 g/m² will be used as the product layer and applied to one side of the thermoplastic resin film. A dissolved or melted olefin resin with a viscosity of 3000 cps is applied onto one side of the thermoplastic resin film by a transfer-printing or a spray coating to form a resin layer with circular physical interval gaps of 0.6 mm or with foggy droplet physical interval gaps of 0.001 mm-1 mm respectively with a gram weight of 3 g/m². These layers are pressed with a rubber roller having a hardness of 90 D and a smooth steel roller having a roller temperature of 25° C. at a pressure of 0.4 MPa to form a laminate. The speed of the production line speed is 150 m/min, and the bonding strength between the product layer and the thermoplastic resin film is 1.5 and 1.78 N/15 mm respectively. The obtained laminates have a vapor permeation rate of 1650 and 1680 g/m²*24 h respectively (according to ASTM E96-2000 D method) with barrier function. The hydrostatic pressures are 2,200 and 2,000 mm $H_2O$ (according to AATCC 127). The laminates pass the fluid barrier test with a Dyne value of 42, the blood barrier test (ASTM F1670) and the virus bacterial barrier test (ASTM F1671), and are capable of blocking solid dusts with a size of 5 nm or more and aerosols (YY/T 0506.5-2009). These examples show that the spray coating method contributes greatly to the peeling force, but the uniformity of the laminate is not desirable.

What is claimed is:

1. A laminate of thermoplastic resin film with vapor-permeable barrier function, wherein said laminate comprises:
   at least one layer of non-amorphous thermoplastic resin film having a continuous structure in a thickness of 1-120 μm with vapor-permeable barrier function;
   at least one layer of natural or chemical product layer with a gram weight of 1-250 g/m²; and
   one or more resin layers with a gram weight of 0.1 g/m² to 550 g/m², which are made from thermoplastic resin and/or curable resin, which is located between the thermoplastic resin film and the product layer in order to bond the thermoplastic resin film and the product layer together, and which have physical gaps in size of 700 nm to 3 mm;
   wherein the natural or chemical product layer is a discontinuous film, a non-woven product, a viscose fiber product, and/or a textile fiber product;
   wherein the thermoplastic resin film with vapor-permeable barrier function is formed from a thermoplastic resin composition which, by mass percentage, comprises the following components: 3-95% thermoplastic non-amorphous elastomer resin material with a proportion of 5% or more hydrophilic segment, 1-99% polar thermoplastic resin material, and 0-28% compatibilizer selected from thermoplastic resin material;
   wherein the thermoplastic non-amorphous elastomer resin material with a proportion of 5% or more hydrophilic segment is one or more material selected from the group consisting of: a copolymer or a polymer blend of dicarboxylic acid with diol and epoxide, a copolymer or a polymer blend of diamide with diol and epoxide, and a copolymer or a polymer blend of binary isocyanic acid with diol and epoxide;
   wherein the polar thermoplastic resin material is one or more thermoplastic resin materials selected from the group consisting of: a polyvinyl chloride resin, a vinylidene chloride resin, a vinyl acetate resin, polyvinyl alcohol, polyvinyl acetal, a nylon resin, a polyacetal resin, a polyformaldehyde resin, a polycarbonate resin (PC), a polysulfone resin, a celluloid, cellulose acetate plastics, a thermoplastic polyester, epoxy resins, and their copolymer or blend thereof;
   wherein said compatibilizer is one or more substances selected from the group consisting of: carboxylic acid graft polymer or its blend, epoxy graft polymer or its blend, oxazoline graft polymer or its blend, imide graft polymer or its blend, isocyanate graft polymer or its blend, and mixture thereof; and
   wherein said laminate is capable of blocking solid dusts, aerosols, bacteria, virus and liquid with a size larger than 5 nm.

2. The laminate according to claim 1, wherein the discontinuous film of the natural or chemical product layer is formed from a second thermoplastic resin and/or a second curable resin.

3. The laminate according to claim 2, wherein said laminate has a barrier function with a hydrostatic pressure test of 1400 mm $H_2O$ or more (according to AATCC 127), said laminate is capable of blocking solid dusts with a size larger than 5 nm and aerosols (according to YY/T 0506.5-2009), and said laminate passes a liquid barrier test with a Dyne value of less than 50, a blood barrier test (according to ASTM F1670) and a virus/bacterial barrier test (according to ASTM F1671).

4. The laminate according to claim 1, wherein the textile fiber of the natural or chemical product layer is a fibrous material selected from the group consisting of: polyester and its derivative fibers, nylon and its derivative fibers, polyurethane and its derivative fibers, polypropylene fiber and its derivative fiber, polyolefin and its derivative fiber, aramid and its derivative fiber, polyimide and its derivative fiber, and cotton products.

5. The laminate according to claim 4, wherein said laminate has a barrier function with a hydrostatic pressure test of 1400 mm $H_2O$ or more (according to AATCC 127), said laminate is capable of blocking solid dusts with a size larger than 5 nm and aerosols (according to YY/T 0506.5-2009), and said laminate passes a liquid barrier test with a Dyne value of less than 50, a blood barrier test (according to ASTM F1670) and a virus/bacterial barrier test (according to ASTM F1671).

6. The laminate according to claim 1, wherein said thermoplastic resin composition comprises 40 to 70% thermoplastic non-amorphous elastomer resin material with a proportion of 5% or more hydrophilic segment, 30-60% polar thermoplastic resin material, and 1-10% compatibilizer selected from thermoplastic resin material.

7. The laminate according to claim 6, wherein said laminate has a barrier function with a hydrostatic pressure test of 1400 mm $H_2O$ or more (according to AATCC 127), said laminate is capable of blocking solid dusts with a size larger than 5 nm and aerosols (according to YY/T 0506.5-2009), and said laminate passes a liquid barrier test with a Dyne value of less than 50, a blood barrier test (according to ASTM F1670) and a virus/bacterial barrier test (according to ASTM F1671).

8. The laminate according to claim 1, wherein a shape of the physical gap is selected from the group consisting of a foggy droplet shape, a round shape, a decorative pattern shape, an irregular net shape, a spiral shape, a hollow shape, and an omega shape.

9. The laminate according to claim 8, wherein said laminate has a barrier function with a hydrostatic pressure test of 1400 mm H₂O or more (according to AATCC 127), said laminate is capable of blocking solid dusts with a size larger than 5 nm and aerosols (according to YY/T 0506.5-2009), and said laminate passes a liquid barrier test with a Dyne value of less than 50, a blood barrier test (according to ASTM F1670) and a virus/bacterial barrier test (according to ASTM F1671).

10. The laminate according to claim 1, wherein said laminate has a barrier function with a hydrostatic pressure test of 1400 mm H₂O or more (according to AATCC 127), said laminate is capable of blocking solid dusts with a size larger than 5 nm and aerosols (according to YY/T 0506.5-2009), and said laminate passes a liquid barrier test with a Dyne value of less than 50, a blood barrier test (according to ASTM F1670) and a virus/bacterial barrier test (according to ASTM F1671).

* * * * *